US00RE35864E

United States Patent [19]

Weingardt

[11] E Patent Number: Re. 35,864

[45] **Reissued Date of Patent: *Jul. 28, 1998**

[54] PARI-MUTUEL ELECTRONIC AND LIVE TABLE GAMING

[76] Inventor: Gary Weingardt, 5416 Gipsy, Las Vegas, Nev. 89107

[ * ] Notice: The portion of the term of this patent subsequent to Jan. 4, 2011, has been disclaimed.

[21] Appl. No.: 743,672

[22] Filed: Nov. 6, 1996

Related U.S. Patent Documents

Reissue of:

[64] Patent No.: 5,476,259
Issued: Dec. 19, 1995
Appl. No.: 152,462
Filed: Nov. 12, 1993

U.S. Applications:

[63] Continuation-in-part of Ser. No. 897,363, Jun. 11, 1992, Pat. No. 5,275,400.

[51] Int. Cl.[6] ..... A63F 9/24

[52] U.S. Cl. ..... 463/28; 463/25

[58] Field of Search ..... 463/28, 25, 16, 463/13, 12; 364/412, 410; 273/292, 274, 138.1, 138.2, 85 CP

[56] References Cited

U.S. PATENT DOCUMENTS

| | | | |
|---|---|---|---|
| 3,697,698 | 10/1972 | Oswald et al. | 179/15 |
| 4,842,278 | 6/1989 | Markowicz | 273/138 |
| 5,159,549 | 10/1992 | Hallman, Jr. et al. | 364/412 |
| 5,226,661 | 7/1993 | Wolf | 273/274 |
| 5,282,620 | 2/1994 | Keesee | 273/138 |
| 5,364,104 | 11/1994 | Jones et al. | 273/292 |
| 5,364,105 | 11/1994 | Jones | 273/292 |
| 5,368,305 | 11/1994 | Rodda et al. | 273/292 |

*Primary Examiner*—Jessica Harrison
*Assistant Examiner*—Michael O'Neill
*Attorney, Agent, or Firm*—John Edward Roethel

[57] ABSTRACT

The invention provides electronic video casino games in which the players are competing against each other to win from a common pool and are not wagering against the house. The invention also provides live casino table games in which the players are competing against each other to win from a common pool and are not wagering against the house. The house retains an preestablished commission. The player cashes out his accrued credits or his accrued gaming chips for an amount determined by the value of the common pari-mutuel pool. The present invention also provides for pari-mutuel pools to be distributed to all coin columns in a predetermined manner so as to allow all participants to be able to win a predetermined mathematical proportional share of the pari-mutuel progressive jackpot payouts. The invention also provides for seeding of the pools by the gaming establishment and for funding of future pools by setting aside into future pools portions of wagers made by current players. In pari-mutuel table games, each game is funded from the master pari-mutuel pool for the operation of the individual game. Should any table game become short of credits or chips, the master pool will disperse credits as needed to the respective tables. Should any tables have an excessive amount of credits, these credits will be transferred into the master pari-mutuel pool. All credits cashed out by the players come out of the master pari-mutuel pool.

74 Claims, 13 Drawing Sheets

PARI-MUTUEL VIDEO POKER
PAYOUT SCHEDULE

| | 1st Coin Winners | 2nd Coin Winners | 3rd Coin Winners | 4th Coin Winners | 5th Coin Winners |
|---|---|---|---|---|---|
| Royal Flush Pari-mutuel | 800<br>Plus 1,200 Pari-mutuel Progressive 2,000<br>ODDS 2,000 : 1 | 1,600<br>Plus 2,400 Pari-mutuel Progressive 4,000<br>ODDS 4,000 : 2 | 2,400<br>Plus 3,600 Pari-mutuel Progressive 6,000<br>ODDS 6,000 : 3 | 3,200<br>Plus 4,800 Pari-mutuel Progressive 8,000<br>ODDS 8,000 : 4 | 4,000<br>Plus 6,000 Pari-mutuel Progressive 10,000<br>ODDS 10,000 : 5 |
| Straight Flush | 50 | 100 | 150 | 200 | 250 |
| 4 of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 2 | 4 | 6 | 8 | 10 |
| Jacks or Better | 1 | 2 | 3 | 4 | 5 |

FIG. 3

PARI-MUTUEL VIDEO POKER
MULTI-LEVEL PAYOUT SCHEDULE

| | 1st Coin Winners | 2nd Coin Winners | 3rd Coin Winners | 4th Coin Winners | 5th Coin Winners |
|---|---|---|---|---|---|
| Royal Flush Pari-mutuel | 250<br>Plus 100% of one Coin Pool (Progressive) | 500<br>Plus 100% of 1 & 2 Coin Pools (Progressive) | 750<br>Plus 100% of 1 thru 3 Coin Pools (Progressive) | 1,000<br>Plus 100% of 1 thru 4 Coin Pools (Progressive) | 1,250<br>Plus 100% of 1 thru 5 Coin Pools (Progressive) |
| | ODDS | ODDS | ODDS | ODDS | ODDS |
| Straight Flush | 50 | 100 | 150 | 200 | 250 |
| 4 of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 2 | 4 | 6 | 8 | 10 |
| Jacks or Better | 1 | 2 | 3 | 4 | 5 |

FIG. 4

PARI-MUTUEL VIDEO POKER
MULTI-LEVEL PAYOUT SCHEDULE

| | 1st Coin Winners | 2nd Coin Winners | 3rd Coin Winners | 4th Coin Winners | 5th Coin Winners |
|---|---|---|---|---|---|
| Royal Flush Pari-mutuel | 250 Plus 100% of one Coin Pool (Progressive) | 500 Plus 100% of 1 & 2 Coin Pools (Progressive) | 750 Plus 100% of 1 thru 3 Coin Pools (Progressive) | 1,000 Plus 100% of 1 thru 4 Coin Pools (Progressive) | 1,250 Plus 100% of 1 thru 5 Coin Pools (Progressive) |
| | ODDS | ODDS | ODDS | ODDS | ODDS |
| Straight Flush | 50 (Progressive) | 100 (Progressive) | 150 (Progressive) | 200 (Progressive) | 250 (Progressive) |
| 4 of a Kind | 25 (Progressive) | 50 (Progressive) | 75 (Progressive) | 100 (Progressive) | 125 (Progressive) |
| Full House | 9 (Progressive) | 18 (Progressive) | 27 (Progressive) | 36 (Progressive) | 45 (Progressive) |
| Flush | 6 (Progressive) | 12 (Progressive) | 18 (Progressive) | 24 (Progressive) | 30 (Progressive) |
| Straight | 4 (Progressive) | 8 (Progressive) | 12 (Progressive) | 16 (Progressive) | 20 (Progressive) |
| Three of a Kind | 3 (Progressive) | 6 (Progressive) | 9 (Progressive) | 12 (Progressive) | 15 (Progressive) |
| Two Pair | 2 (Progressive) | 4 (Progressive) | 6 (Progressive) | 8 (Progressive) | 10 (Progressive) |
| Jacks or Better | 1 (Progressive) | 2 (Progressive) | 3 (Progressive) | 4 (Progressive) | 5 (Progressive) |

FIG. 5

PARI-MUTUEL MULTI-DECK VIDEO POKER
MULTI-LEVEL PAYOUT SCHEDULE

| | 1st Coin Winners | 2nd Coin Winners | 3rd Coin Winners | 4th Coin Winners | 5th Coin Winners | 6th Coin 6th Card Winners | 7th Coin 7th Card Winners |
|---|---|---|---|---|---|---|---|
| Super Royal Flush | — | — | — | — | — | 25,000 progressive | 100,000 Progressive |
| Royal Flush | 250 progressive | 500 progressive | 750 progressive | 1000 progressive | 4,000 progressive | 7,000 progressive | 10,000 progressive |
| Super Straight Flush | — | — | — | — | — | 350 progressive | 455 progressive |
| Straight Flush | 50 progressive | 100 progressive | 150 progressive | 200 progressive | 250 progressive | | |
| Super 5/6 of a Kind | — | — | — | — | — | 203 progressive | 315 progressive |
| 4 of a Kind | 25 progressive | 50 progressive | 75 progressive | 100 progressive | 125 progressive | | |
| Super Full House | — | — | — | — | — | 70 progressive | 98 progressive |
| Full House | 8 progressive | 16 progressive | 24 progressive | 32 progressive | 40 progressive | | |
| Super Flush | — | — | — | — | — | 42 progressive | 56 progressive |
| Flush | 5 progressive | 10 progressive | 15 progressive | 20 progressive | 25 progressive | | |
| Super Straight | — | — | — | — | — | 35 progressive | 49 progressive |
| Straight | 4 progressive | 8 progressive | 12 progressive | 16 progressive | 20 progressive | | |
| Three of a Kind | 3 progressive | 6 progressive | 9 progressive | 12 progressive | 15 progressive | | |
| Two Pair | 2 progressive | 4 progressive | 6 progressive | 8 progressive | 10 progressive | | |
| Jacks or Better | 1 progressive | 2 progressive | 3 progressive | 4 progressive | 5 progressive | | |

FIG.6

PARI-MUTUEL MULTI-DECK VIDEO POKER
MULTI-LEVEL LOTTERY PAYOUT SCHEDULE

| | 1st Coin Winners | 2nd Coin Winners | 3rd Coin Winners | 4th Coin Winners | 7th Coin 5th Card Winners | 7th Coin 6th Card Winners | 7th Coin 7th Card Winners |
|---|---|---|---|---|---|---|---|
| Super Royal Flush | — | — | — | — | 10,000 progressive | 50,000 progressive | 1,000,000 Progressive |
| Royal Flush | — | — | — | — | — | | |
| Super Straight Flush | — | — | — | — | 250 progressive | 350 progressive | 455 progressive |
| Straight Flush | — | — | — | — | — | | |
| Super 5/6 of a Kind | — | — | — | — | — | 203 progressive | 315 progressive |
| 4 of a Kind | — | — | — | — | 125 progressive | | |
| Super Full House | — | — | — | — | — | 70 progressive | 98 progressive |
| Full House | — | — | — | — | 40 progressive | | |
| Super Flush | — | — | — | — | — | 42 progressive | 56 progressive |
| Flush | — | — | — | — | — | | |
| Super Straight | — | — | — | — | — | 35 progressive | 49 progressive |
| Straight | — | — | — | — | — | | |
| Three of a Kind | — | — | — | — | — | | |
| Two Pair | — | — | — | — | — | | |
| Jacks or Better | — | — | — | — | — | | |

FIG.7

PARI-MUTUEL ELECTRONIC AND LIVE TABLE GAMING

Matter enclosed in heavy brackets [ ] appears in the original patent but forms no part of this reissue specification; matter printed in italics indicates the additions made by reissue.

CROSS-REFERENCE TO RELATED APPLICATIONS

This application is a Continuation-in-Part of Application Ser. No. 07/897,363, filed Jun. 11, 1992, entitled Pari-Mutuel Electronic Gaming, now U.S. Pat. No. 5,275,400.

This invention relates to electronic gaming devices such as video poker, slot machines, twenty-one games or craps games, and more particularly to a method and apparatus for operating an electronic gaming device in which the payouts are based on a pari-mutuel system so that the percentage earned by the gaming establishment is predetermined. This invention also relates to live casino table games such as twenty-one games, craps games or baccarat games, and more particularly to a method and apparatus for operating live casino table games in which the payouts are based on a pari-mutuel system so that the percentage earned by the gaming establishment is predetermined.

BACKGROUND OF THE INVENTION

This invention relates to both electronic gaming devices and live casino table games which are designed to comply with both federal and state gaming regulations. For the most part, traditional electronic gaming devices, such as video poker machines, slot machines, twenty-one games or craps games as well as live casino table games such as twenty-one, craps and baccarat have not been able to comply with such regulations.

This compliance is accomplished through program designs for the play, of these games which will cause them to be played in adherence to pari-mutuel definitions.

Pari-mutuel betting is considered the fairest system of betting known and is generally credited with the elimination of bookmakers at racetracks. The pari-mutuel system was devised in 1870 by Pierre Oller, a French businessman. The term pari-mutuel derives from the French expression meaning "a wager among ourselves". There have been many improvements in pari-mutuel wagering since its inception. The present method of calculating payoff prices in pari-mutuel pools was set up in 1908 by Col. Matt J. Winn and Judge Charles Franklin Price of Louisville, Ky. These methods have remained fairly standard in the United States and Canada.

The general concept of pari-mutuel wagering comprises a betting system in which winners share the total stakes wagered on an event minus a percentage for the management. Another way of stating this is that pari-mutuel wagering is a form of betting in which the losers' wagers (less a percentage for the house and taxes) are distributed among the winners. A representative example of pari-mutuel wagering occurs in horse race betting in which those who bet on the winning horses share the total stakes wagered minus a small percentage set aside for the management and to fund the purses in the horse race. In the typical horse race pari-mutuel wagering system, the first three horses (the win horse, the place horse and the show horse) create winning events for the bettor.

Machines have been developed that record and calculate the payoffs in a pari-mutuel wagering system. Traditionally a pari-mutuel machine has been defined as a machine for registering and indicating the number and nature of bets made (as on a horse race) in the pari-mutuel system of betting. Electronic pari-mutuel machines have been developed that register the wagers in pari-mutuel betting as they are made and calculate and post the changing odds and final payoffs.

Video poker has become one of the most desirable games of choice in the history of modern legalized gaming. Video poker is a generic term covering a myriad of electronic gaming devices, referred to as video poker machines, that simulate the play of different types of poker games. In its original form, a video poker machine electronically displayed a five card draw poker hand. The player had the option of holding or discarding any of the five displayed cards. The video poker machine would then display replacement cards for the cards that had been discarded. The player would win multiples of his original bet based on the type of poker hand that he had achieved after the draw of the cards. The payouts were based on traditional poker hand ranking with a Royal Flush being the highest and paying the player the most, all the way down to a Pair of Face Cards that would pay the player one-for-one odds on his original bet. Any hand less than a Pair of Face Cards would be a loser.

A traditional video draw poker machine uses a single deck of 52 cards and has one player using that single deck. The deck is reshuffled after every hand. It is a simple mathematical calculation to determine the probability of the various types of poker hands being achieved on any single deal and draw. The payouts can then be selected so that the house will hold a percentage of the wagers made. On any given hand, there is no guarantee that the house will win, rather the profit of the game is realized by the probabilities involved from the play of the machine over a long period of time.

In traditional electronic video poker machines, the house can adjust the pay tables according to the laws of probability, putting the odds in favor of the house. The house then banks the game and takes wagers with the odds in their favor and relies on the laws of probability for its profits. Another factor the house uses to increase its profits is the lack of proficiency and inexperience of the player with regard to draw poker probability and theory of play. This also results in an increase of the level of the house's profits.

Electronic video poker machines as described above do not operate in a pari-mutuel manner. Players do not typically compete for common pools of money in these games. They are played as house banking games and therefore fall outside legalized gaming as defined and permitted in most states. Pari-mutuel gaming on the other hand is legal and permitted in a vast majority of states within the United States. The present invention describes game formats which will comply with these pari-mutuel regulations and, therefore, be playable in all states allowing these types of gaming activities.

Indian tribal gaming operations have become a large and controversial form of gaming in recent years. At present, the Federal Indian Gaming Regulatory Agency is in the process of prohibiting all coin operated gaming devices on Indian land unless the tribe enters into a compact with the state government that authorizes the use of these types of gaming devices. It may be assumed that the introduction of pari-mutuel-type electronic gaming machines will allow for a much smoother entry into these markets as these machines will comply with regulations already in force in most states.

Currently, table games such as twenty-one, craps and baccarat are played as house banked games. A house banked game is any game of chance that is played with the house as a participant in the game, where the house takes on all players, collects from all losers and pays all winners, thus deriving all profits from the outcome of the game. These games can also be played as player banked where one player banks and plays against the other players. In many states, house banked gaming is illegal, therefore many establishments, including those on Indian reservations, have resorted to allowing player banked table games. There are, however, some disadvantages with player banked games. Player banked games move at a noticeably slower rate and the amounts that a player wagers are often limited due to the amount carried by the banker. For example, should a player with only one hundred dollars bank the game, he may choose to wager only twenty dollars, thus greatly limiting the amounts which the other players can wager.

In pari-mutuel table games, the house cannot win money from the players but can only collect a commission on wagers. With a commission level established which would provide sufficient profits to the operators this could, however, be a boon rather than a detriment. While the house could no longer win money from the players, it could also not lose money to the players. This would allow for a far lower level of capital funding necessary for the operation of the casino and would also remove pressure on the bankroll of the casino because there will not be any abnormal periods of losses by the house. Traditionally, in house banked casinos, due to pressure from upper management, floor persons and pit bosses have a tendency to show undue concern over the money won by players. In turn, pressure is placed on the dealers when players win big bets. This typically creates a somewhat hostile environment for the player and has a negative effect on public relations with the players. However, in a pari-mutuel table game system, whatever a player bets and regardless of whether he wins or loses, the house's commission is determined by the rate of collection (or "rake") on the player's wager. Should the player win that bet, the house still retains the commission on that one wager, and would continue to collect the commission on any future bets that player may make.

This would change the attitude of casino management because the house's profits are not based on the outcome of the game. In a game such as twenty-one, the house could modify the rules of play to make the game more advantageous to the player (e.g., paying 2 to 1 on a blackjack rather than 3 to 2, paying double the bet for having five cards or more with 21 or under, allowing players to hit aces after splitting them rather than allowing for only one card on each ace, etc.).

Many racetracks are apprehensive with regard to having casino games on the premises for fear that casino gaming may detract from the wagering on horse racing, thus making casino gaming the primary choice of wagering and deteriorating the value of the sport of kings. However, by allowing for transfer of funds from a master pari-mutuel pool into a pool such as a jackpot horse race pool, the stakes on the racetracks can be greatly increased which would insure more wagering on horses. For example, the pari-mutuel horse race jackpot pool could be increased due to transfer of funds from the master pari-mutuel pool for players who could pick the trifecta pool (first, second and third horse in a precise order for a particular race). This high increase in the jackpot pool would attract more players to wager on races.

It is envisioned that, with the introduction of gaming machines that comply with regulations in force in most airspace in the U.S., the placement of pari-mutuel electronic video poker consoles on airliners will provide the passengers with a source of entertainment heretofore unavailable. The value of this in terms of both the attraction and additional revenues for an ailing U.S. airline industry cannot be overemphasized.

Pari-mutuel wagering is legal in every state except Utah and Hawaii. Pari-mutuel video games on aircraft can conceivably be played while flying over the airspace of states which have expanded their existing pari-mutuel gaming laws to include pari-mutuel video gaming. This allows the states to generate additional revenues through gaming taxes without having the disadvantages which come with the spread of gaming in their state. Gaming taxes can be collected on a pro-rated basis by the participating states.

In the past, there has been no need to legally transport gaming equipment across state lines continuously. Now with the advent of pari-mutuel electronic video gaming on aircraft, gaming equipment will be crossing state lines continuously. In order for states to collect taxes while video gaming is being played in their air space, there will have to be a sharing of revenue (gaming taxes) from the pari-mutuel pools by states on the aircraft's route.

Also with pari-mutuel gaming the passengers will be playing against other passengers and not against the airline. This should eliminate resentment towards the carrier by people who lose, since the airline is just managing the machines and not participating in any wagering.

Aside from the obvious advantages of pari-mutuel in-flight gaming, as it allows for the placement of gaming devices on aircraft which conform to legal requirements in all states in which overflight occurs, it also has the ability to establish a procedure for the collection of gaming debts incurred during in-flight gaming. Historically, gaming debts have proven difficult to collect in states which consider certain gaming transactions against public policy. For example, if an operator of a cruise ship operating in international waters extends credit to a player the operator may find that this debt is uncollectible when suit is brought against the player in his state of residence.

Many of the international flights spend a substantial amount of flight time over U.S. airspace (e.g. Los Angeles to London, Los Angeles to Paris and New York to Tokyo). In some of these examples approximately 50% of the flight could be restricted from any gaming revenue. If these hours lost are typically the hours most passengers are not sleeping, then gaming revenues will be down significantly.

Typically, if twenty video poker machines are hooked up together on a progressive jackpot system, the jackpot will rarely exceed ten thousand dollars. An aircraft flying on a domestic route is usually a narrow bodied aircraft, able to seat only an average of one hundred passengers. Therefore, without a multi-deck video poker game on the aircraft, it would be necessary to have five progressive jackpot pools in order for the progressive jackpot to reach as high as ten thousand dollars; twenty machines per progressive. The more machines hooked up to one progressive jackpot pool, the less the jackpot would be, thus the need to limit the number of machines per progressive jackpot pool. Having five different progressive pools on one aircraft would clearly cause problems. Passengers seated on a machine which is linked to a lower progressive jackpot pool would want to move to a seat in which the machine is hooked up to a higher progressive jackpot pool. This would result in the shuffling around of passengers aboard an aircraft. Needless to say, there will be passengers who will be unwilling to give up their seat, whether or not they are gambling, causing unnecessary animosity between passengers.

If a progressive jackpot on one aircraft is much higher than jackpots on other aircraft, passengers may tend to abandon flights with lower jackpots in favor of flights with higher jackpots, thus causing schedule problems for the airlines. Therefore, a sharing of jackpot pools is necessary in order to maintain uniform jackpots throughout the fleet.

The principles of the present invention can also be applied to slot machines, twenty-one games and craps games that are also operated as electronic equipment. These machines can be programmed to operate in a pari-mutuel fashion with the house retaining a predetermined percentage of each wager made.

In view of the inability of traditional electronic gaming devices, such as video poker machines, slot machines, twenty-one games and craps games, to meet legal requirements in most states because the traditional electronic gaming devices are based on probability for determining profits, it is one of the objects of the present invention to provide a method of playing electronic gaming devices that will satisfy legal restrictions in most states and thus satisfy the legal requirements existent in a rapidly expanding marketplace.

Also, in view of the inability of traditional live casino table gaming, such as twenty-one games, craps games and baccarat games, to meet legal requirements in most states because the traditional live casino table games are house banked games, it is one of the objects of the present invention to provide a method of playing live casino table games that will satisfy legal restrictions in most states and thus satisfy the legal requirements existent in a rapidly expanding marketplace.

It is a feature of the present invention to program an electronic gaming device to operate based on a pari-mutuel wagering system so that the amount the player can win is based on the amounts that have been wagered by that player and other players less a portion set aside for the gaming establishment that is providing the gaming device.

It is a further feature of the present invention to operate a live casino table game based on a pari-mutuel wagering system so that the amount the player can win is based on the amounts that have been wagered by that player and other players less a portion set aside for the gaming establishment that is providing the gaming device.

It is an advantage of the present invention that the profit to the gaming establishment is predetermined because it is based on a preset portion of each wager that is deducted from the common pari-mutuel pool available to the player for a winning hand or for redeeming his accrued credits. This will make electronic gaming machines and live casino table gaming legal in those states and jurisdictions that permit pari-mutuel wagering.

Other objects, features and advantages of the present invention will become apparent from a consideration of the following detailed description.

SUMMARY OF THE INVENTION

The present invention is designed specifically to comply with gaming regulations to provide an electronic video poker game, an electronic slot machine, an electronic twenty-one game or an electronic craps game in which the players are competing against each other to win from a common pool and are not wagering against the house. The present invention is also designed specifically to comply with gaming regulations to provide live casino table games such as twenty-one, craps or baccarat in which the players are competing against each other to win from a common pool and are not wagering against the house. The house retains an preestablished commission. When a player stops playing his machine or the live table game, he can cash out his accrued credits or his accrued gaming chips for an amount determined by the value of the common pari-mutuel pool. The present invention also provides for pari-mutuel pools to be distributed to all coin columns in a predetermined manner so as to allow all participants (not only the ones who play maximum coins) to be able to win a predetermined mathematical proportional share of the pari-mutuel jackpot pool (progressive payouts). The invention also provides for seeding of the pools by the gaming establishment and for funding of future pools by setting aside into future pools portions of wagers made by current players. In pari-mutuel table games, each live casino table game is funded from the master pari-mutuel pool for the operation of the individual game. Even though the master pari-mutuel pool is owned by the players, pari-mutuel table games eliminate the feeling of playing against one another, making the gamble less personal, thus resulting in less dissension among the players. Should any table game become short of credits or chips, the master pool will disperse credits as needed to the respective tables. Should any tables have an excessive amount of credits, these credits will be transferred into the master pari-mutuel pool. All credits cashed out by the players come out of the master pari-mutuel pool.

BRIEF DESCRIPTION OF THE DRAWINGS

FIG. 3 shows a representative pari-mutuel video poker payout schedule in which the pari-mutuel payouts are distributed equally to all coin columns.

FIG. 4 shows another representative pari-mutuel video poker payout schedule.

FIG. 5 shows a representative pari-mutuel multi-level video poker payout schedule with progressive payouts at all levels.

FIG. 6 shows another representative pari-mutuel multi-level video poker payout schedule with progressive payouts at all levels and including six and seven card hands.

FIG. 7 shows a representative pari-mutuel, multi-level, multi-deck video poker lottery-type payout schedule with progressive payouts at all active levels and including six and seven card hands.

DETAILED DESCRIPTION OF THE PREFERRED EMBODIMENTS

Figure 1:
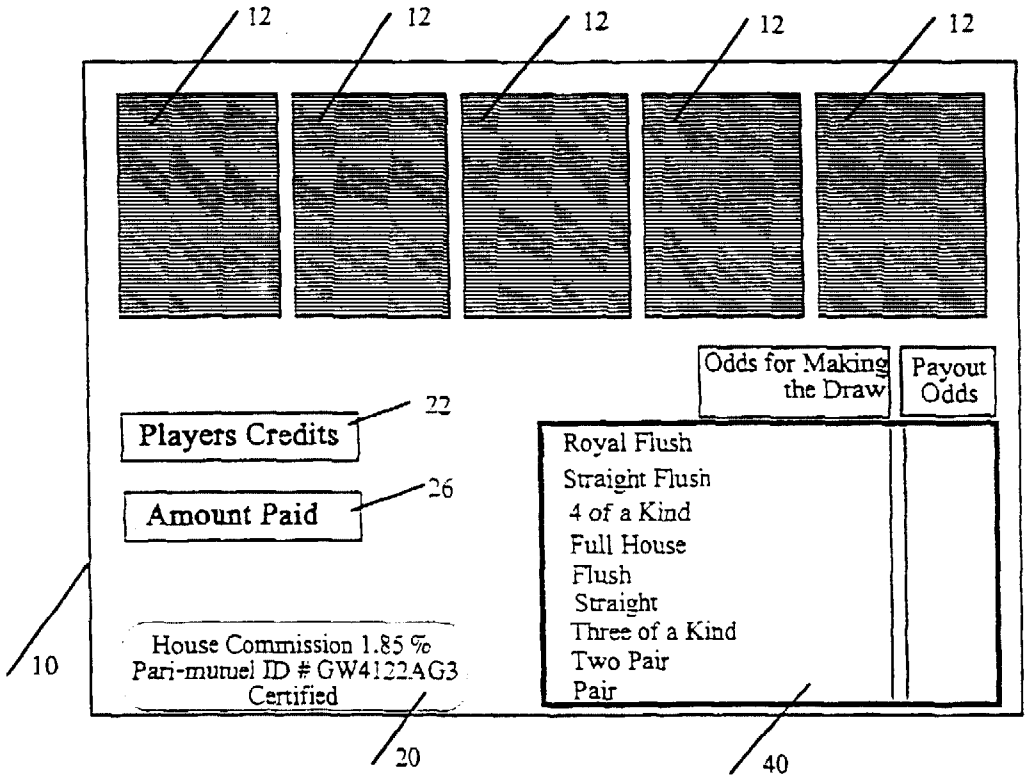
FIG. 1 shows a typical electronic video poker display that appears on the screen of an electronic gaming device programmed to operate in accordance with the method of the present invention.

In order to explain the concepts and features of the present invention, certain terms need to be defined. As used in the present invention, the following terms have the following meanings:

Pari-mutuel Electronic Video Poker Machine:

An electronic video poker machine programmed to register bets in pari-mutuel betting as they are made and to calculate and post the changing odds and final payoffs. This video poker machine can also register and indicate the number of bets made and the nature of the application of these bets to specific coin columns and payout schedules. All pools are funded by an equal percentage of common funds. This pari-mutuel electronic video poker machine satisfies the definition of pari-mutuel by nature of its accumulation of monies into common pools which are competed for by all players.

Multi-level Pari-mutuel Electronic Video Poker Machine:

An electronic video poker machine programmed to register bets in pari-mutuel betting as they are made and to calculate and post the changing odds and final payoffs. This video poker machine can also register and indicate the number of bets made and the nature of the application of these bets to specific coin columns and payout schedules. The coin columns and payout schedules are used in a system in which specific pools are funded more or less independently of other pools but linked by a common pari-mutuel pool from which all others are funded. Although funding is from a common pool, contributions to various other pools is not equal. Each specific coin column has its own independent pari-mutuel pool. At each level of participation, players are afforded the opportunity to win all monies accrued in all pools up to and including the one applying to the level of their participation.

Common Pari-mutuel Pool:

A common pari-mutuel pool is established for the disbursement of all payoffs on all levels. This pool is established by the players and belongs to the players. The common pool is the repository for all monies derived from wagering activities of the players. All payouts are derived from this common pool. Funding for all progressive pools is derived from this common pool. A sufficient level must be maintained in the common pool to provide funds for the payment of all winning bets at levels other than jackpots. The removal of funds from the common pool for purposes other than the payment of hands from the standard pay table may only be permitted when sufficient funds exist in the common pool to ensure the integrity of the common pool. A formula can be created to establish the levels at which sufficient funds exist so that money may be properly disbursed from the common pool into other pools.

Positive Common Pari-mutuel Pool:

A positive common pari-mutuel pool exists when the monies deposited as a result of players' wagering activities exceeds the total number of credits outstanding among all participating players.

Negative Common Pari-mutuel Pool:

A negative common pari-mutuel pool exists when the total number of credits outstanding among all participating players exceeds the monies deposited as a result of players' wagering activities.

Pari-mutuel Progressive Pool:

Pari-mutuel progressive pools are pools established for the purpose of creating jackpots for specific pre-designated winning hands. The pari-mutuel progressive pool is created by the deposit of funds from the common pool upon the attainment of a specified level of money in the common pool. When this level is attained, subsequent monies (or a percentages of the subsequent monies) are then deposited into established pari-mutuel progressive pools according to an established formula. These monies may be deposited into one or various progressive pools.

Current and Future Pari-mutuel Progressive Pools:

Progressive pools for the payment of designated jackpot hands may, by the nature of losing wagers accumulating more quickly than winning wagers, reach money levels which may allow for the disbursement of excess funds into future pools. This is effected in order to eliminate the necessity of borrowing from the house to seed the progressive pools in order to maintain desired money levels in the progressive pools. Funding into future pools is done only when money levels in a current pool reaches a preestablished level. Upon the attainment of this preestablished level, the method of the present invention would automatically transfer funds into future pools in accordance with a predetermined formula.

Pari-mutuel Seed Pools:

Monies for the payment of jackpots may need to be established through the creation of a seed pool. This is generally the case at the outset of any game or series of games when no funds have yet been collected from players' wagering activities. In order to create an attractive level of payoff for pre-designated winning hands, progressive pools must be established at specific starting dollar amounts. The present invention contemplates the creation of an escrow account, designated as a seed pool, for the establishment of the specific starting levels of the pools. Monies needed to fund progressive pools at specified levels are borrowed from this seed pool by the common pool in a manner which will continue to maintain the integrity of the common pool. Repayment of these borrowed funds shall be accomplished automatically and continually. Funds from the common pool should not be allowed to intermingle with seed pool funds. The transfer of funds from one pool to the other shall be only in the form of a loan which shall be paid back immediately upon the accumulation of sufficient funds in the common pool.

Seeding of Pari-mutuel Video Poker:

Pools are created by wagering activities of competing players. The gaming establishment that provides the machines is not involved in the banking of these games. All monies derived from players' wagers become part of the common pool used for payouts, with the exception of a prescribed house commission. In order to begin play at a level which enhances and encourages play, the house will sometimes participate in the seeding of a pool on a temporary basis. This is accomplished by simply placing an amount of money established by the house into a pool in order to have funds available to begin play in a game. These funds are later retrieved by the house, in accordance to a preestablished formula, as money is fed into the common pool by players' betting activities. After the initial seeding is done by the house, all subsequent funding is accomplished through players' wagering activities. If the nature of payouts is skewed in a manner so as to create a future negative pool situation, then the house may once again be required to the seed the pools. At all times, a preestablished formula is used to recover all seed monies originally supplied by the house. This is not only desirable but is also necessary in order to maintain a pure pari-mutuel format.

Master Pari-Mutuel Pool:

A master pari-mutuel pool is established for the disbursement of all payoffs. This pool is established by the players and belongs to the players. The common pool is the repository for all monies derived from wagering activities of the players on all games. All payouts are derived from this common pool. Funding for all progressive pools is derived from this master pool. A sufficient level must be maintained in the master pool to provide funds for the payment of all winning bets at levels other than jackpots. The removal of funds from the master pool for purposes other than the payment of winning hands on all games may only be permitted when sufficient funds exist in the master pool to ensure the integrity of the master pool. A formula can be created to establish the levels at which sufficient funds exist so that money may be properly disbursed from the master pool into other pools.

Table Game Pari-Mutuel Subpool:

In pari-mutuel table games, each casino table game is funded from the table game pari-mutuel subpool for the operation of the individual game, which is a subpool or portion of the master pari-mutuel pool. Even though the table game pari-mutuel subpool is owned by the players, pari-mutuel table games eliminate the feeling of playing against one another, making the gamble less personal, thus resulting in less dissension among the players. Should any table game become short of credits or chips, the table game pari-mutuel subpool will disperse credits as needed to the respective tables. Should any tables have an excessive amount of credits, these credits will be transferred into the table game pari-mutuel subpool and from there to the master pari-mutuel pool. All credits cashed out by the players come out of the table game pari-mutuel subpool or the master pari-mutuel pool, as appropriate.

The table game pari-mutuel subpool of the master pari-mutuel pool can often become highly excessive in funds, mainly due to the fact that there are no large jackpots to be hit on table games. This makes money in the subpool inaccessible to the players, and since the house has already collected commission from the players, the funds in the subpool remain dormant. It is necessary for the house to create a mechanism which would place the money back into play and make it accessible to the players. This mechanism would be the sharing of pools between the table game subpools and other pari-mutuel subpools. This allows the master pool to seed other pari-mutuel subpools which have either gone into the negative or require a high jackpot payout. By transferring funds from the master pool into another pari-mutuel subpool, the stakes in the subpool which received the funds are raised, thus generating more play, which in turn increases commission to the house. Because the house makes profits based on the wagers made, it is not only management's responsibility to manage the games, but it is also their responsibility to adequately manage the pari-mutuel subpools and the master pari-mutuel pool and to disperse funds to the players in a manner which will attract more wagering.

In order to minimize house participation after initial seeding, the present invention includes a method by which future pools are funded by current wagering activity. When a predetermined level is reached in any one pool, a percentage of all subsequent wagers shall be deposited into future pools. This enables current players to benefit from past players in the same manner that future players benefit from current players. This also allows players to leave and enter the game at will without adversely affecting the pools.

Closing the pool:

Should a gaming establishment determine for any reason that it will be closing the master pari-mutuel pool (or any of the pari-mutuel subpools), a mechanism can be established which will pay out all of the money in the pari-mutuel pool back to the players. This can be accomplished by having one large jackpot which would pay out the entire remaining balance in the pari-mutuel pool to the winner. Once the jackpot is hit, all of the games associated with the pool being closed are completed, the players collect whatever existing credits they may have and the remaining balance is paid to the winner of the jackpot. For example, if the master pari-mutuel pool is being closed and the winning jackpot is hit, all electronic video games freeze after the completion of the current player's hand and all table games and sporting events complete any games in progress. The players then cash in any credits they have on the electronic video games, any gaming chips they have on the table games and any winning tickets that they have on the sporting events. The remaining balance of the master pari-mutuel pool is then paid to the winner of the jackpot.

The present invention is also applicable to pari-mutuel slot machines of the type in which rotating reels carry symbols, such as fruits and sevens. Various combinations of symbols are preestablished as winning symbols according to predetermined payout tables. A traditional slot machine is set by placing different symbols on at least three different reels. The number of corresponding symbols for each reel are established by a probability chart for the aligning of like symbols in a row. The probability chart, in conjunction with the randomness of the reels, establishes the payout schedule and the percentage the house should win. The house banks the traditional slot machine and accepts wagers by the players. The house sets the odds in its favor, at any desired level which may be permitted by the gaming regulators and the house relies on the laws of probability for its profits.

In the present invention, a pari-mutuel slot machine is provided with established progressive pools for specific payoffs. A pool for specific payoffs is seeded by the house and the amount of this jackpot is posted in conjunction with the slot machine. Money that has been wagered by the players is deposited into a common pool during the course of play with a specified house commission subtracted. Payoffs are made from this common pool for all winners except jackpot winners. As monies are accrued in this common pool from losing wagers, any monies above an established level, minus the house commission, are deposited into the pari-mutuel jackpot pool. The integrity of the common pool is maintained in order to supply monies for the payment of winners and all excesses are directed into the progressive jackpot pool. The house receives its established commission from each coin played but does not participate in the wagering. In effect, all monies beyond the established percentage to the house are available for distribution to the players.

Because symbols are still placed on each respective reel, the winners are determined according to the laws of probability. But the amount of profit to the house is not determined by the laws of probability because the house takes a predetermined percentage of each wager. Rather the laws of probability merely affect how much money is deposited into the pari-mutuel jackpot pool.

The method of the present invention can be explained with reference to an electronic video poker game operated in a pari-mutuel manner. FIG. 1 shows generally at 10 a display screen that is used on a conventional electronic video poker machine. In this example, a five card draw game is depicted with the five cards 12 constituting the player's hand being displayed. The display screen 10 is also provided with a credit meter 22 on which is shown the player's number of accumulated credits. Each player participating in the draw poker game of the present invention uses his own electronic video poker machine and the machines are electronically linked together in a conventional manner through a central computer to constitute a bank of machines.

At the beginning of a player's participation, the player accrues credits on his credit meter 22 by inserting coins, tokens, currency, coupons, plastic cards or any other device that can be read by the gaming device for the purpose of allocating credits to the player's credit meter 22. The player then wagers one or more credits in a conventional manner to activate the gaming machine and, in the example shown in FIG. 1, cause the five cards 12 to be displayed on the screen 10.

The player then selects which cards he wishes to hold and discard in a conventional manner and the display screen 10 then also shows a probability chart 40 that advises the player of the odds of achieving a particular winning hand based on the cards the player has decided to hold. The probability chart 40 also advises the player of the payout odds the player would receive if he achieved a winning combination. The player then activates a deal button which replaces his discarded cards with new cards and the gaming machine determines whether the player has won or lost. If the player wins, the amount of his winnings are automatically added to the credit meter 22 and the gaming machine resets for the next hand.

As a matter of security and information to the player, the display screen 10 also displays at 20 the pari-mutuel ID # of that particular machine and the percentage of the house commission that the gaming establishment earns for providing the gaming machine for play.

In general, at the beginning of the game, a player deposits money into the gaming machine and credits are designated on the credit display meter 22 of the gaming machine. This initial deposit of money can be done in any one of a number of conventional ways; e.g. by coins being fed into a coin acceptor in the gaming machine, by feeding currency or coupons into a bill acceptor incorporated into the gaming machine or attached thereto or by electronically transferring credits from a plastic card such as a bank card or the like. The initial deposit of money is registered to a common pari-mutuel pool, less a portion designated for the gaming establishment. A plurality of gaming machines, each operated by a player, can be linked together as a bank of machines that all contribute to the same common pari-mutuel pool.

When any player stops playing his machine and desires to cash out his credits, his payout is calculated by dividing the total number of currently outstanding credits among all players into the total amount of money in the common pool to determine the value of each credit. The player's credits are then converted to a payout amount by multiplying his credits by the value of each credit. The amount paid out to the player is displayed on the amount paid meter 26 which also constitutes part of the video display 10. The actual money can be paid to the player through a conventional payout hopper incorporated into the gaming machine or the player's money can be credited directly to his plastic card placed in a conventional card reader/writer which forms part of the gaming machine. Players remaining in the game will then be competing for the money remaining in the pool and each subsequent payout will then be calculated using the previously cited formula.

Figure 2:
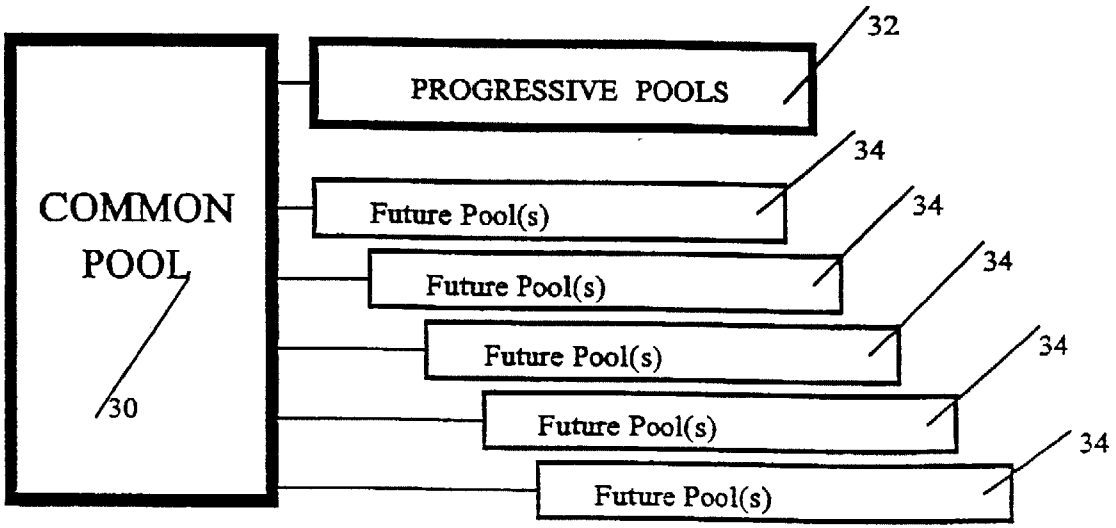
FIG. 2 shows a block diagram depicting the relationship between the common pool, the progressive pools and the future pools.

FIG. 2 shows a diagrammatic depiction of how the money accrued in the common pari-mutuel pool can be distributed. All money initially wagered is accrued in the common pool 30. One or more progressive pools 32 are fed by money from the common pool 30. These progressive pools are maintained to provide jackpots for certain predetermined winning combinations that a player may achieve during the course of play of the gaming machine. Progressive pools are commonly seeded at an initial starting level to encourage play of the gaming device. It is desirable in the present invention to provide for one or more future pools 34, also funded by the common pool 30, so that a source of money is available to fund the future progressive pools 32 whenever a progressive pool 32 is won by a player and it needs to be refunded.

In electronic video poker, each player is competing to achieve certain types of poker hands and to receive predetermined payouts for achieving such hands. The payouts are multiples of the number of coins that the player has wagered. For example, in most electronic video poker machines, a player can wager one to five coins or credits on a particular hand. If the player wagers one coin or credit and achieves Three of a Kind, his payout is three times his wager, viz. 3 coins or credits. A wager of five coins or credits would yield a payout of 15 coins or credits based on the same three-for-one odds. In conventional electronic video poker machines, players are encouraged to wager the maximum number of coins or credits (usually five) because the progressive payouts are only payable for maximum coins wagered. In the present invention, all payouts to the players come from the common pari-mutuel pool which holds all wagers made by the players, less the portion set aside for the gaming establishment. Therefore, the money in the common pari-mutuel pool can be designated to the various winning combinations in any manner desired by the house with no risk to the house because its profit has already been determined by the size of the portion of the wagers set aside for the house.

FIG. 3 shows a representative pari-mutuel video poker payout schedule in which the pari-mutuel payouts are distributed equally to all coin columns.

For example, if the player has wagered one coin and achieves a straight, the player wins 4 coins. His winnings are automatically registered on the credit meter 22 on the video display 10 (see FIG. 1). In the payout schedule shown in FIG. 3, the player wins a fixed number of credits plus a portion of the pari-mutuel pool whenever the player achieves a royal flush. The amount of the players winnings is greater if he has wagered a higher number of coins.

In this schedule, the pari-mutuel payouts accrue only at the royal flush level and wagers allocable to the pari-mutuel payouts are disbursed equally to each coin column according to the following distribution formula:

1st Coin Column: A+B

2nd Coin Column: 2A+B

3rd Coin Column: 3A+B

4th Coin Column: 4A+B

5th Coin Column: 5A+B where

A=coin column pay table (wager) and

B=equal percentage of coins deposited going to each respective coin column progressive pool.

FIG. 4 shows another representative pari-mutuel video poker payout schedule. In this schedule, there are five separate progressive pools—one for each number of coins wagered. If a player wagers only one coin and he achieves a royal flush, then he receives a fixed number of coins and 100% of the one-coin progressive pool. However, if the player wagers more than one coin and achieves a royal flush, then he wins a fixed number of coins plus 100% of the all of the progressive pools up to the number of coins that he has wagered. This payout schedule encourages players to wager the maximum number of coins, yet still allows the player wagering lesser amounts to win a progressive payout.

In this schedule, the pari-mutuel payouts accrue only at the royal flush level and wagers allocable to the pari-mutuel payouts are disbursed to each coin column based on the level of play (number of coins deposited). The pari-mutuel payouts are funded from a common pool which allocates funds to each specific coin column pool. A predetermined formula will establish the percentage of funds applied to each coin column according to the following distribution formula:

1st Coin Column: A+B

2nd Coin Column: 2A+B+C

3rd Coin Column: 3A+B+2C

4th Coin Column: 4A+B+3C

5th Coin Column: 5A+B+4C where

A=coin column pay table

B=percentage of wager applied to corresponding coin column, and

C=percentage of wager applied to previous coin columns.

The percentage of funds going to previous coin columns can be as little as zero.

FIG. 5 shows a representative pari-mutuel multi-level video poker payout schedule with progressive payouts at all levels. This payout schedule expands the concept of the FIG. 4 payout schedule to include progressive pools for each type of hand that a player might achieve during a hand of draw poker.

In this schedule, the pari-mutuel payouts are disbursed throughout all winning hand levels and wagers allocable to the pari-mutuel payouts are disbursed to each coin column based on the level of play (number of coins deposited). The pari-mutuel payouts are funded from a common pool which allocates funds to each specific coin column pool. A predetermined formula will establish the percentage of funds applied to each coin column according to the following distribution formula:

1st Coin Column: A+B

2nd Coin Column: 2A+B+C

3rd Coin Column: 3A+B+2C

4th Coin Column: 4A+B+3C

5th Coin Column: 5A+B+4C where

A=coin column pay table

B=percentage of wager applied to corresponding coin column, and

C=percentage of wager applied to previous coin columns.

The percentage of funds going to previous coin columns can be as little as zero.

FIG. 6 shows another representative pari-mutuel multi-level video poker payout schedule with progressive payouts at all levels and including six and seven card hands. This payout schedule is an expansion of the FIG. 5 payout schedule into a draw poker game in which the player can also have six or seven card hands. Draw poker using six or seven card hands is disclosed in U.S. Pat. No. 5,042,818, issued on Aug. 27, 1991 to Gary Weingardt, the disclosure of which is incorporated by reference herein.

In this schedule, the pari-mutuel payouts are disbursed throughout all winning hand levels and wagers allocable to the pari-mutuel payouts are disbursed to each coin column based on the level of play (number of coins deposited). The pari-mutuel payouts are disbursed by a formula according to the degree of difficulty in achieving a particular winning hand and the pari-mutuel payouts are funded from a common pool which allocates funds to each specific coin column pool. A predetermined formula will establish the percentage of funds applied to each coin column according to the following distribution formula:

1st Coin Column: A+B

2nd Coin Column: 2A+B+C

3rd Coin Column: 3A+B+2C

4th Coin Column: 4A+B+3C

5th Coin Column: 5A+B+4C

6th Coin Column: D(6A+B+5C)

7th Coin Column: 2D(7A+B+6C)

where

A=coin column pay table

B=percentage of wager applied to corresponding coin column

C=percentage of wager applied to previous coin columns, and

D=difficulty of achieving a winning hand.

The percentage of funds going to previous coin columns can be as little as zero.

FIG. 7 shows a representative pari-mutuel, multi-level, multi-deck video poker lottery-type payout schedule with progressive payouts at all active levels and including six and seven card hands. This payout schedule is an expansion of the FIG. 6 payout schedule into a draw poker game in which the gaming machine is programmed to only have payouts for particular types of poker ranking hands. In this example, certain low probability, high payout hands are selected and the higher probability, lower payout hands are not winners. The essence of this lottery-type draw poker game is the awarding of higher payouts caused by the elimination of payouts for lower pay table hands. Draw poker using this type of lottery format low probability, high payout hands is also disclosed in U.S. Pat. No. 5,042,818, issued on Aug. 27, 1991 to Gary Weingardt, the disclosure of which is incorporated by reference herein.

In this schedule, the pari-mutuel payouts are disbursed through preselected hand levels in the pay table and wagers allocable to the pari-mutuel payouts are disbursed to each coin column based on the level of play (number of coins deposited). The pari-mutuel payouts are disbursed by a formula according to the degree of difficulty in achieving a particular winning hand and the pari-mutuel payouts are funded from a common pool which allocates funds to each specific coin column pool. A predetermined formula will establish the percentage of funds applied to each coin column according to the following distribution formula:

1st Coin Column: A+B

2nd Coin Column: 2A+B+C

3rd Coin Column: 3A+B+2C

4th Coin Column: 4A+B+3C

5th Coin Column: 5A+B+4C

6th Coin Column: D(6A+B+5C)

7th Coin Column: 2D(7A+B+6C)

where

A=coin column pay table

B=percentage of wager applied to corresponding coin column (may be zero in some columns)

C=percentage of wager applied to previous coin columns (may be zero in some columns), and D=difficulty of achieving a winning hand.

The percentage of funds going to previous coin columns can be as little as zero.

The principles of the present invention can also be applied to a pari-mutuel video twenty-one game. An electronic video machine is programmed to play twenty-one against a dealer's hand displayed by the machine. All cards, both the player's and the dealer's, are selected randomly from either one or a multiple of decks. Players will accumulate credits in accordance with their winning and losing against the dealer's hand in accordance with the traditional rules of twenty-one. All credits shall be issued in accordance with standard pay tables established for twenty-one (i.e., even money for winning hands, odds of 3 to 2 for blackjacks, etc.)

Whenever a player cashes out, his credits are added to the total number of outstanding credits among all players to establish his percentage of the total common pool. Seeding and the collection of the house's commission shall be accomplished in the same manner as has been described for video poker games.

The principles of the present invention can also be applied to pari-mutuel machines programmed to play craps. An electronic coin operated video machine is programmed to play Craps against the established odds for specific rolls of the dice. All dice rolls shall be random rolls of one pair of dice. Players shall be awarded credits in accordance with their success in winning in accordance to a standard pay table for craps (i.e., various odds for specific dice rolls.)

When a player cashes out, his credits are added to the total number of outstanding credits among all players to establish his percentage of the total common pool. Seeding and the collection of the house's commission shall be accomplished in the same manner as has been described for video poker games.

An example of the basic concept of the present invention can be shown using an electronic pari-mutuel video poker machine that operates with a common pool having a positive value compared to the initial value of the player's credits. A plurality of gaming machines are linked together to form a bank and, for example, ten players each deposit $1,000 and receive 1,000 credits each on the credit display meter on the gaming machine of the bank that each is playing. At a point in time, one player hits a royal flush worth 4,000 credits bringing his credit total to 5,500. At this point he chooses to cash out his credits and leave the game. All credits accumulated by all remaining players are totaled and come to 1,200 total. This means there are a total of 6,700 credits outstanding. Dividing $10,000 by 6,700 establishes a value of $1.49 per credit so the player cashing out is awarded $8,195 and the remaining players continue to compete for the remaining $1,805. New players may come in at any time. Their money is deposited into the common pari-mutuel pool and they are allocated credits on the basis of the value of their initial contribution and when they cash out, they receive payment based on the per credit value at the time they cash out.

It is also possible that the electronic pari-mutuel video poker machine will operate with a common pool that has a negative value compared to the initial value of the player's credits. Ten players deposit $1,000 each and receive 1,000 credits each on the credit display meter. At a point in time, one player hits a royal flush worth 4,000 credits bringing his credit total to 5,500. At this point he chooses to cash out. All credits accumulated by all remaining players are totaled and come to 11,200 total. This means there are a total of 16,700 credits outstanding. Dividing $10,000 by 16,700 establishes a value of $.60 per credit so the player cashing out his 5,500 credits is awarded $3,300 and the reining players continue to compete for the remaining $6,700. New players may come in at any time. Their money is deposited into the common pari-mutuel pool and they are allocated credits on the basis of the value of their initial contribution and when they cash out, they receive payment based on the per credit value at the time they cash out, which could be either a positive or a negative value depending on when they cash out.

Another example of the present invention is an electronic pari-mutuel video poker machine that operates with a progressive pool. Ten players deposit $1,000 each and receive 1,000 credits each on the credit display meter on the gaming machine. At a point in time, one player hits a royal flush worth 4,000 credits bringing his credit total to 5,500. All credits accumulated by all remaining players are totaled and come to 1,200 total. This means there are a total of 2,700 credits outstanding in addition to the progressive jackpot pool. The player hitting the royal flush is awarded $7,300 for his jackpot. This represents the fixed royal flush value of $4,000 plus all remaining 3,300 credits outstanding which are not owned by other players. Remaining players then may continue to wager for the remaining $2,700.

In order to make the game of the present invention attractive to players at all times, it may be necessary to initially seed the progressive pools so that the players are not playing for a small stake. This would occur at the initial start up of the game or at anytime that a player has just won a progressive jackpot. The house predetermines the beginning value of each progressive pool and money from the common pool or money set aside into the future pools is used as the seed money for the beginning value of the progressive jackpot.

Bingo is considered pari-mutuel gaming as all players are competing for the same prize pool on any given game. Prizes for each game during a particular bingo session are preset and advertised by the management and are paid as stated regardless of attendance at any particular session. This establishes a clear precedent for seeding of a pari-mutuel pool. Bingo management's ability to achieve a level of receipts necessary to provide seed money as advertised is a direct function of attendance (i.e.: each attendee represents a specific calculable dollar amount). In the traditional bingo operation, there is no provision made for the recovery of the house's seed money for the progressive pools other than the initial receipts of the fees charged to the players to participate. The cost of seeding the progressive pools in bingo is simply the cost of doing business.

In the present invention, a method of recovering the initial seed money for the progressive pools is provided. A portion of each initial wager can be designated to go into one or more future pools to fund the seeding of the progressive jackpots. Alternatively, whenever a progressive pool reaches a preestablished value, all or part of additional money which would normally go directly into the progressive pool can be diverted into the future pools. In a certain sense, the pari-mutuel video poker method of the present invention more precisely prescribes to the true definition of a pari-mutuel game because, not only do all players compete for the same prize pool, but all pool monies are derived from the wagering activities of the players.

Following is an example of a pari-mutuel electronic video poker machine with a fully seeded progressive pool. Ten players begin play with independent and varying bankrolls. The house has established a jackpot pool of $4,000 for a royal flush. At some point in time, one player hits the royal flush and is awarded the guaranteed $4,000. At this point the total money accumulated in the common pool is $9,000. After the payment of the $4,000 jackpot, $5,000 remains in the common pool.

If all players were to cash out at this point and their combined number of credits totaled $3,000, then $3,000 would be paid out and $2,000 would remain in the seeded pool. The house would then deposit an additional $2,000 into the seed pool to meet the jackpot guarantee for a royal flush. In this instance, the house would be in a negative position at this point in time of play. In other instances, the accumulation of players losing wagers into a future pool would supply funds at sufficient levels to allow the house to recover its seed money without diminishing the integrity of the guarantees. Various scenarios could be described to illustrate various levels of both positive and negative involvement by the house in its seeding activities.

In order for the game to continue, the house must be willing to continue to supply seed money as needed. If this money is withdrawn and there is not a sufficient accumulation of funds in the common pool to meet guarantees, the game is over and remaining funds are disbursed to players on a pro rata basis.

Another example of the present invention is an electronic pari-mutuel video poker machine operated in a manner that provides for funding for present and future pools. Players begin play with various bankrolls. Play has continued to a level which has afforded the house the ability to recover all seed monies. A level of funds has been accumulated in the common pool to fully fund both common pool requirements and jackpot guarantees. At this point, a percentage of all monies accumulated in the common pool, not required for common pool integrity or other guarantees, is accumulated into future pools for future guarantees. If players' gaming activities should subsequently create a deficiency in the common pool or jackpot guarantee funds, these pools must be replenished before any further deposits can be made into future pools. It is possible at any time for players' successful wagering activity to deplete all accumulated funds and for the common pool to once again draw upon the house's seeding account which has been established for seeding purposes.

If all players discontinue play, monies accumulated in both present and future pools will remain available for all future players.

In California card rooms, players are awarded jackpot money when particular hands are achieved during the course of play of the standard poker games. The house sets a specific beginning jackpot level and collects money from all players to feed the progressive pool that constitutes the jackpot. The house recovers its original seed money and then deposits subsequently collected monies, minus an established commission, into the progressive pool. When jackpot hands are achieved, winning players are paid at the current level of the progressive pool. A new jackpot is then seeded and the process is repeated until a new jackpot hand is achieved. In certain instances seed money for subsequent games is accrued from current progressive pools. Procedures for the recovery of seed money may vary, but some method always exists to insure that all monies are derived from a common pool and are provided by, and available to, all competing players.

Multi-level pari-mutuel wagering is established by common practice in traditional poker games. Players in a poker game are limited in their action by the amount of chips or money which they have on the table at the start of a given hand. If, during the course of a hand, any player runs out of chips, he may declare himself all in and continue to compete for the portion of the pot into which he has contributed. All other players continue to bet into a side pot, or separate pool, which, in effect, is another level of pari-mutuel wagering, and which is not available to the player or players who have not contributed to this new pool. At the end of the poker hand, the players show their hands and the pots are then awarded, or divided, in accordance with the pool eligibility of each particular player as established by his participation.

The present invention also provides a method in which electronic pari-mutuel video poker machine can be operated with multi-level progressive pools.

By definition, pari-mutuel-type wagering in essence is simply a system whereby all players are competing for a common pool of funds. Although it may be necessary, in application, to expand the parameters of this definition as it applies to a particular goal in the evolution of pari-mutuel gaming, this precise definition must remain the constant reference point for the integrity of the concept itself.

There are many types of procedures that can be implemented to allocate that portion of the wagers made as the commission that is earned by the house for the operation of the machines described in the present invention. This commission may be collected by the following methods:

1. A percentage of each coin deposited may be calculated by the machine and applied to a separate pool to be distributed to the house.
2. A percentage of each payout to a winning player may be deducted to be applied to a separate pool to be distributed to the house.
3. Each player may pay a specified amount on an hourly basis to be applied to a separate pool to be distributed to the house.
4. Each player shall pay a percentage of his buy in at the beginning of play to be applied to a separate pool to be distributed to the house.
5. Each player shall pay a specified flat fee charge at the beginning of play to be applied to a separate pool to be distributed to the house.

In all instances a specific percentage, a specified charge or an hourly rate shall be established and posted by the house in order that players are aware of charges and in order that enforcement agencies can verify compliance to regulations and management claims. Microchips can be programmed, when applicable and possible, to verify this compliance in order to facilitate monitoring by regulatory bodies.

Profits for the house will be derived from a collection system rather than odds or player skill. Player skills will be pitted against one another rather than against the house.

Certified non-reprogrammable high security microchips can now be used, as there is no longer a need for management to alter program functions to increase profit margins. Micro-chips will be manufactured with established commission levels built in. Management can choose the desired commission level but cannot alter this level once the chip is installed. The commission will be displayed along with the corresponding serial number of the microchip assigned to that gaming location prominently on the video screen. This will not only provide information to the players, but will also afford gaming regulators the ability to investigate each microchip individually if circumstances necessitate.

Certified artificial intelligence can be made available to players to help them make the best possible decision on any given hand and the payoff available through a successful draw. Odds may be displayed for all possible draws on each hand to give the player a full scope of his options. Through these methods, all players will be afforded the opportunity to maximize their playing skills and increase their opportunity for all monies available.

The gaming machine can be programmed so that the player can initially deposit his money and then automatically play a plurality of games without player intervention. The player, using a menu, selects from a plurality of methods of play offered by the programming of the gaming machine. The player then stands by while the machine electronically plays a preselected number of games and displays to the player the results of those games and the value of the player's resulting account. For example, player selects to have a draw video poker machine hold only those cards that can possibly achieve a royal flush. The player deposits an initial amount capable of playing 1000 hands at a maximum wager amount. After the gaming machine has cycled through 1000 hands, the player is advised on the amount of his winnings or losings that occurred during the play of the 1000 hands. Alternatively, the player can instruct the gaming machine to hold all pairs or all three card flushes or three card straights or various combinations of different cards based on a priority ranking criteria.

Table 1 shows a menu that can be provided on an electronic video poker machine so that the player can select the desired method of play that the player wishes to use for the ensuing games. The player can select by using a touch screen or an electronic pen to mark the boxes that he desires.

MENU

| | DRAW TO ROYAL FLUSH | HOLD |
|---|---|---|
| Player has four (4) cards to a royal flush. | | |
| 1. Player has straight flush | ☐ | ☐ |
| 2. Player has flush | ☐ | ☐ |
| 3. Player has straight | ☐ | ☐ |
| 4. Player has winning pair | ☐ | ☐ |
| 5. Player has nonwinning pair | ☐ | ☐ |
| Player has three (3) cards to a royal flush. | | |
| 1. Player has straight flush | ☐ | ☐ |
| A. Player has 4 cards to a straight flush | ☐ | ☐ |
| 2. Player has flush | ☐ | ☐ |
| A. Player has 4 cards to a flush | ☐ | ☐ |
| 3. Player has straight | ☐ | ☐ |
| A. Player has 4 cards to a straight | ☐ | ☐ |
| 4. Player has 3 of a kind | ☐ | ☐ |
| 5. Player has 2 pair | ☐ | ☐ |
| 6. Player has winning pair | ☐ | ☐ |
| 7. Player has nonwinning pair | ☐ | ☐ |
| Player has two (2) cards to a royal flush. | | |
| 1. Player has straight flush | ☐ | ☐ |
| A. Player has 4 cards to a straight flush | ☐ | ☐ |
| B. Player has 3 cards to a straight flush | ☐ | ☐ |
| 2. Player has 4 of a kind | ☐ | ☐ |
| 3. Player has full house | ☐ | ☐ |
| 4. Player has flush | ☐ | ☐ |
| A. Player has 4 cards to flush | ☐ | ☐ |
| B. Player has 3 cards to flush | ☐ | ☐ |
| 5. Player has straight | ☐ | ☐ |
| A. Player has 4 cards to a straight | ☐ | ☐ |
| B. Player has 3 cards to a straight | ☐ | ☐ |
| 6. Player has 3 of a kind | ☐ | ☐ |
| 7. Player has 2 pair | ☐ | ☐ |
| 8. Player has winning pair | ☐ | ☐ |
| 9. Player has nonwinning pair | ☐ | ☐ |

The principles of the present invention can also be applied to a live casino table game of twenty-one game. The game is dealt in the format of traditional twenty-one and players will accumulate credits or chips in accordance with their winning and losing against the dealer's hand in accordance with the traditional rules of twenty-one. The house collects a commission (or "rake") of a predetermined percentage of each player's wager as the charge for dealing the game. All losing player wagers are placed in the twenty-one game pari-mutuel pool from which winning player wagers are paid.

All credits shall be issued in accordance with standard payout schedules established for twenty-one (i.e., even money for winning hands, odds of 3 to 2 for blackjacks, etc.). Alternatively, the house could make the game more advantageous to the player (e.g. paying 2 to 1 on a blackjack rather than 3 to 2, paying double the bet for having five cards or more with 21 or under, allowing players to hit aces after splitting them rather than allowing for only one card on each ace, etc.). Credits can be electronically displayed or presented in the form of chips. The commission to the house can either be taken out electronically or can be deposited in a drop box.

Whenever a player cashes out, his credits are added to the total number of outstanding credits among all players to establish his percentage of the total common pool. Seeding and the collection of the house's commission shall be accomplished in the same manner as has been described for video poker games.

The principles of the present invention can also be applied to other live table games, *including card games, dice games and other traditional casino games,* such as craps, baccarat, pai-gow poker, roulette, *keno,* [Caribbean Stud®] *CARIBBEAN STUD®* poker and the like. Similarly, these same games, *craps, baccarat, pai-gow poker, roulette, CARIBBEAN STUD® poker, keno and the like,* can be programmed into electronic gaming machines and operated in a pari-mutuel manner. The house collects a commission (or "rake") of a predetermined percentage of each player's wager as the charge for dealing the game in the live table game version or for providing the electronic gaming machine for play by the player. All losing player wagers are placed in the pari-mutuel pool for each individual game from which winning player wagers are paid.

All credits shall be issued in accordance with standard payout schedules established for the particular game involved. When a player cashes out, his credits are added to the total number of outstanding credits among all players to establish his percentage of the total common pool. Seeding and the collection of the house's commission shall be accomplished in the same manner as has been described for video poker games.

Figure 8:
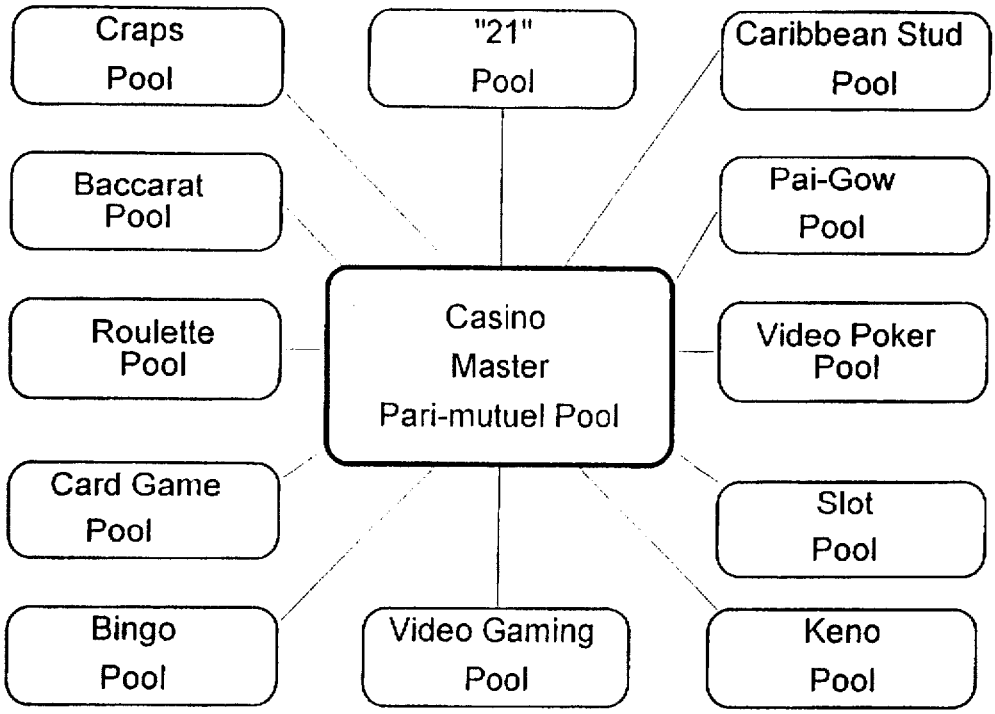
FIG. 8 shows a schematic layout of a plurality of game pari-mutuel pools linked to a central casino master pari-mutuel pool.

FIG. 8 shows a schematic representation of a plurality of pari-mutuel pools established for each of the games to which the principles of the present invention can be applied. Each like kind of game has its own pari-mutuel pool and all of these separate pari-mutuel pools are linked together to a casino master pari-mutuel pool.

In pari-mutuel table games, each casino table game is funded from the master pari-mutuel pool for the operation of that particular game. Should any table game become short of credits or chips, the master pool will disperse credits as needed to the respective table. Should any table game have an excessive amount of credits or chips, these credits or chips will be transferred into the master pari-mutuel pool for that particular game. All credits cashed out by the players come out of the master pari-mutuel pool.

The casino master pari-mutuel pool is operated as a central overall pool to maintain a source of funds for any live table game pool or electronic game pool that may need funding.

Figure 9:
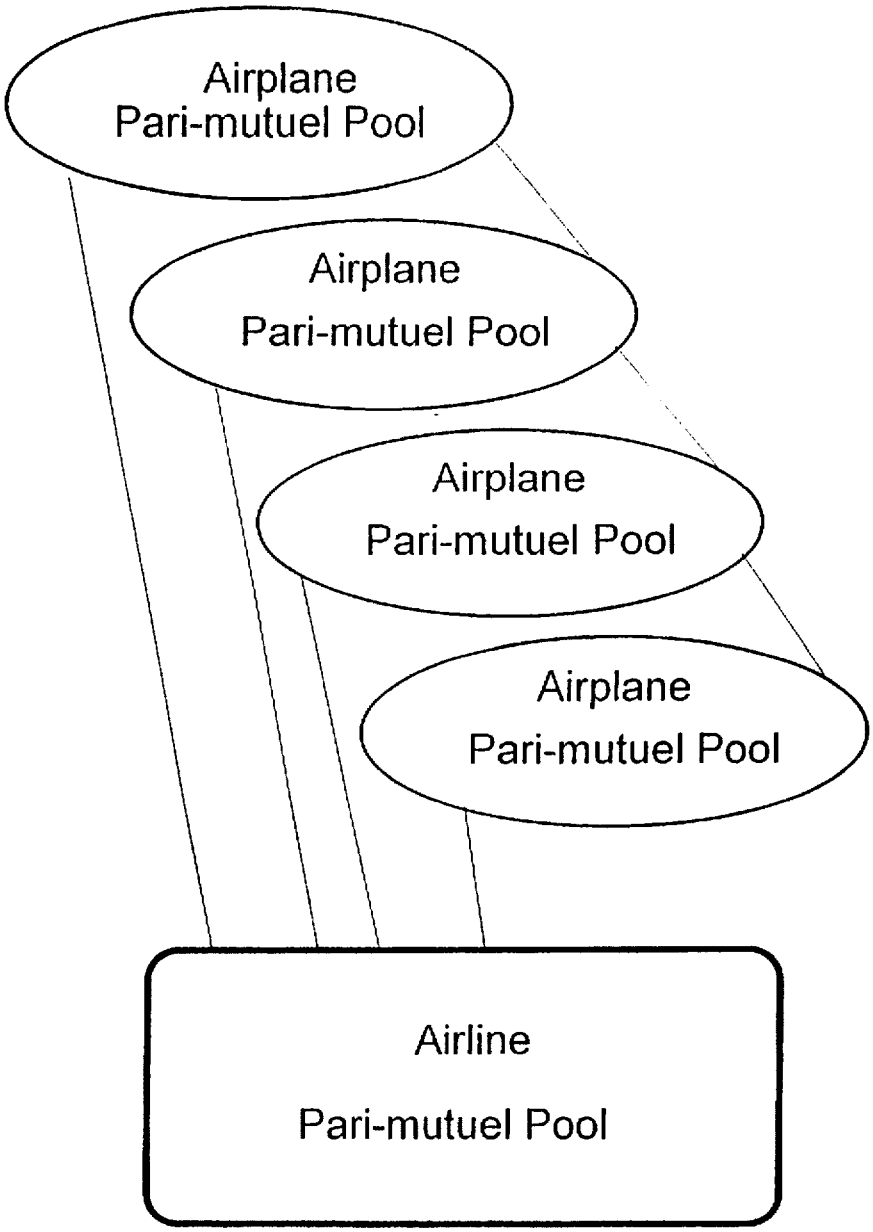
FIG. 9 shows a schematic layout of a central airline pari-mutuel pool linked to a plurality of separate airplane pari-mutuel pools.

FIG. 9 shows schematically how gaming machines operated on individual airplanes can be linked together into a common airline pari-mutuel pool. Each airplane can link together all of its gaming devices into a common pari-mutuel pool and all of the airplanes so equipped can have their pari-mutuel pools jointly linked together into a common airline pari-mutuel pool. Funds can be transferred from the airline common pari-mutuel pool to the individual airplane pari-mutuel pools as needed.

Figure 10:
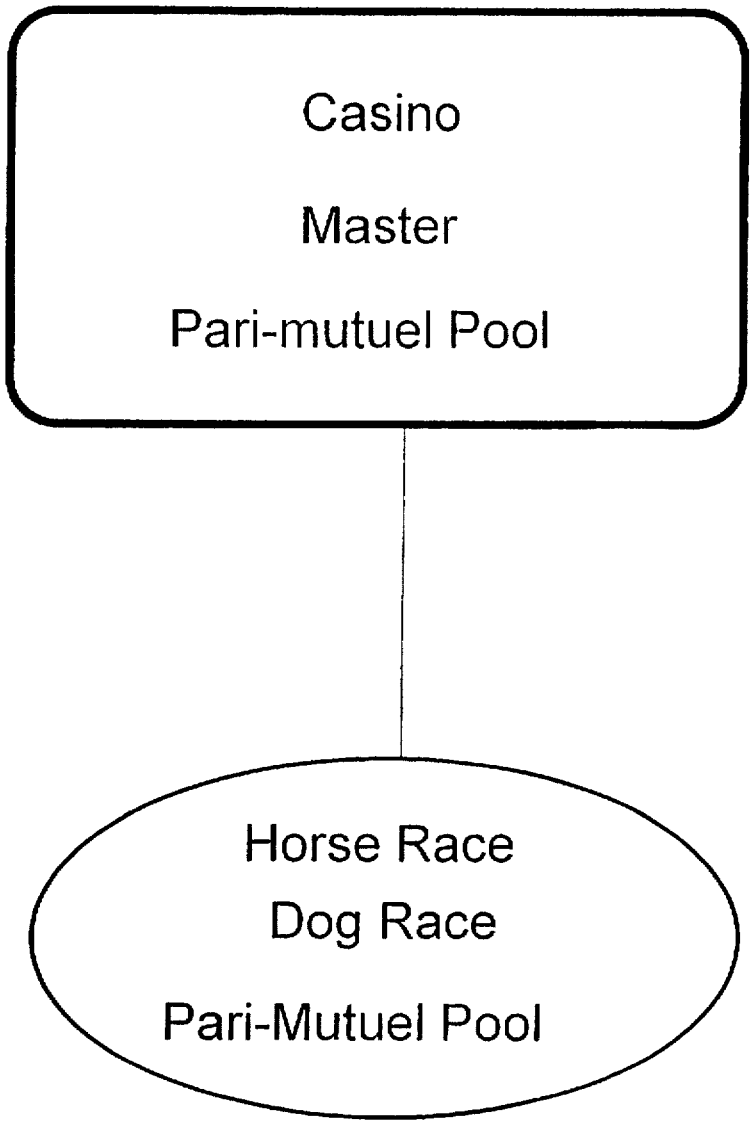
FIG. 10 shows a schematic layout of a central casino master pari-mutuel pool linked to horse or dog race pari-mutuel pool.

FIG. 10 shows schematically the linking of a casino master pari-mutuel pool with the pari-mutuel pools at a horse race track and a dog race track. This linking of pools allows the transfer of funds from the casino master pari-mutuel pool into the horse or dog race pool. Additional funds from the casino master pari-mutuel pool can be added to the horse or dog race pool so that the stakes on the races can be greatly increased which would insure more wagering on the horses or the dogs. For example, the pari-mutuel horse or dog race jackpot pool could be increased by transferring funds from the casino master pari-mutuel pool. Larger payouts can be provided for players who wager in the trifecta pool (picking the first, second and third horses in a precise order for a particular race). This increase in the amount in the horse or dog race jackpot pool would attract more players to wager on races.

Figure 11:
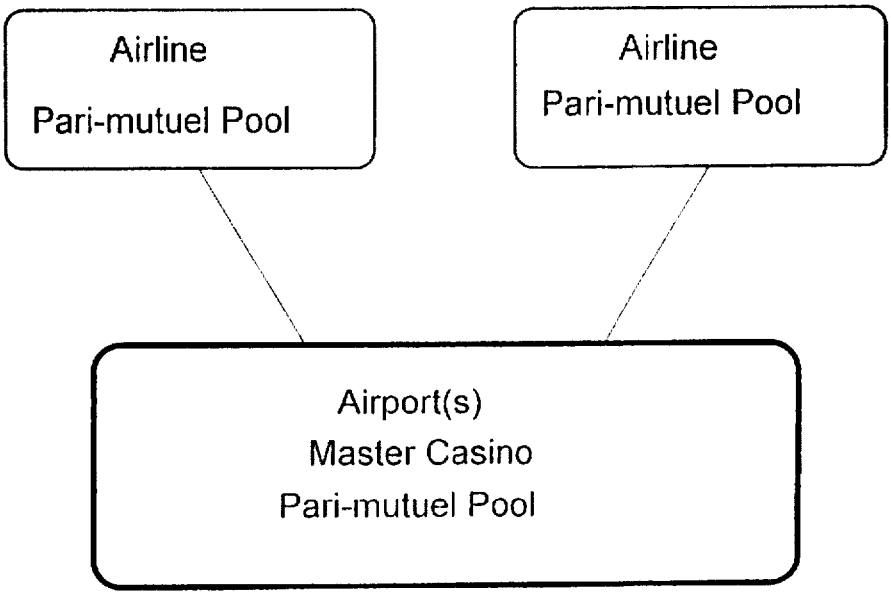
FIG. 11 shows a schematic layout of a airport master casino pari-mutuel pool linked to a plurality of airline pari-mutuel pools.

FIG. 11 shows schematically how each airline pari-mutuel pool can be linked into a common airport master casino pari-mutuel pool. This increases the flexibility of the system because funds from the airport master casino pari-mutuel pool would be available to supplement any individual airline pari-mutuel pool as needed.

Figure 12:
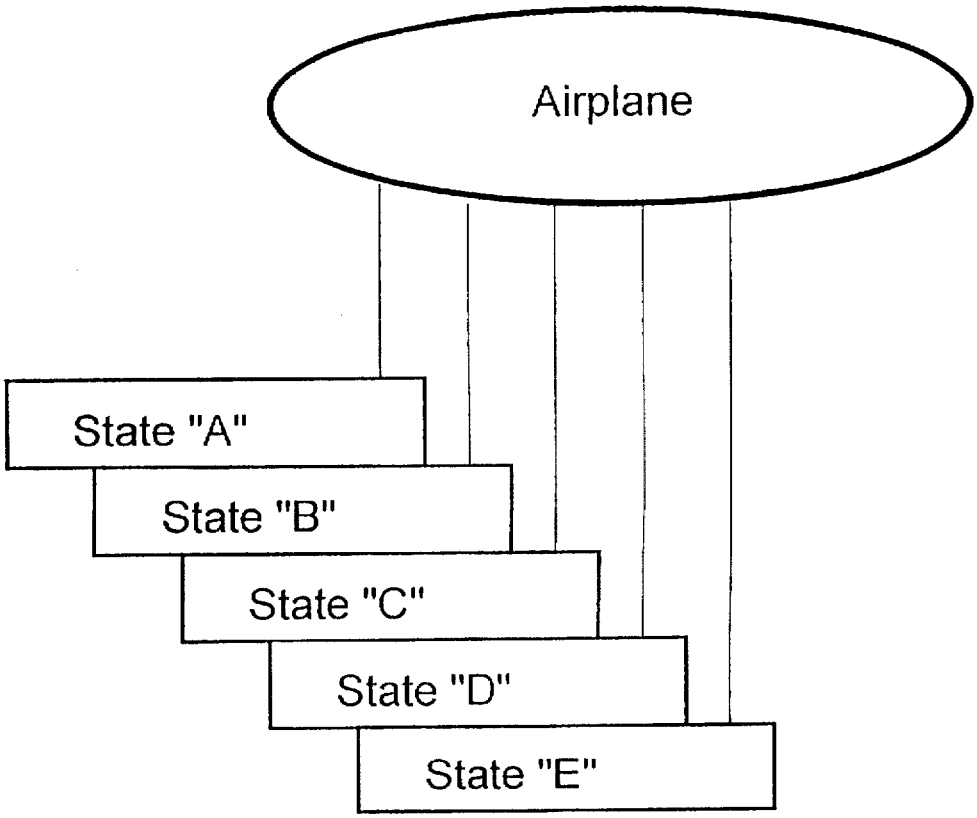
FIG. 12 shows a schematic representation of how a single airplane operating over various states airspace could distribute tax revenues to each of the states.

FIG. 12 shows a schematic representation representing how a single airplane overflying a plurality of states can designate tax revenues to each of the affected states based on flying time over that state or some other appropriate determining factor.

Figure 13:
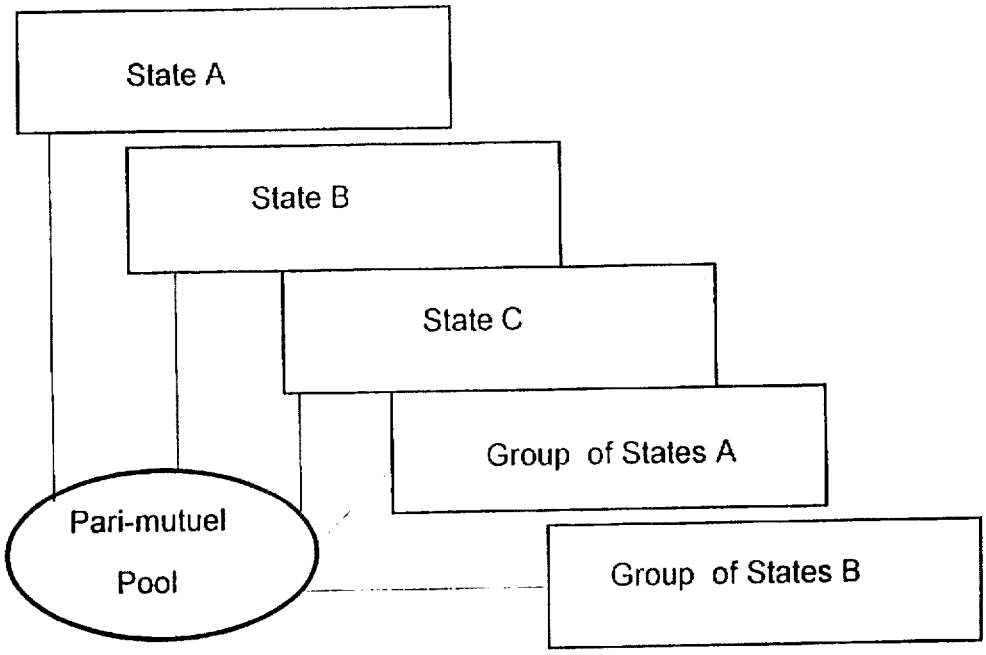
FIG. 13 shows a schematic representation of a common pari-mutuel pool interconnected to a plurality of individual states or groups of states to generate a interstate pari-mutuel game.

FIG. 13 shows schematically how a plurality of states or groups of states can interlink various gaming devices or live table games into a pari-mutuel pool. By using modern data communications, all of the pari-mutuel gaming information can be sent to a common pari-mutuel pool which will track the gaming activity, allocate the share earned by each state or group of states and provide the fund necessary to pay winning players based on the credits the winning players have accrued. The common pari-mutuel pool is also available to supplement, as needed, the individual pari-mutuel pools existing in each state.

With the advent of pari-mutuel video gaming at racetracks and on aircraft, it is anticipated that there will be a need to place gaming machines in remote locations, leaving many machines unattended and unsecured, specifically when the aircraft are parked overnight or the racetracks are closed. Traditional electronic gaming machines have a motherboard and a random number generator which combine to automatically display the playing cards or the reel symbols to the player. Because the electronics are physically located in each individual machine, the machines are vulnerable to tampering. Pari-mutuel electronic video gaming will eventually require many machines scattered in remote locations, greatly increasing the risk of security violations. In order to ensure adequate security for these gaming machines, a new method of operation is necessary.

Advancement in computer technology has greatly reduced both the size and cost of computer components. By applying these technology advances to gaming machines, it is no longer necessary for each individual gaming machine to contain its own motherboard and random number generator. Instead, one central computer can function as the motherboard and control the random number generation for all of the gaming machines connected to the pari-mutuel system. The central computer will download a preselected number of outcomes, or simply one outcome at a time using a file server, that would appear on an electronic gaming device, such as playing card hands, dice displays or slot machine reel stops to the computer memory of each gaming machine.

Using five card draw poker as an example, a gaming machine only needs to receive ten cards from a fifty-two card deck to play a round of draw poker (the initial five card hand displayed to the player and an additional five cards should the player decide to draw an entire new hand). The central computer can download a plurality of ten card hands, say one thousand, into the memory of the gaming machine at the remote location. The player then plays these hands consecutively and when the computer memory runs down to about one hundred hands left, an additional nine hundred hands can be downloaded. This can occur continuously at each of the remote gaming machines connected to the pari-mutuel system.

The central computer can maintain a record of the outcomes that were downloaded to each gaming machine so that management can verify that a potential winning hand was sent to a particular machine. A secure record can be maintained of this data so that winning payouts or jackpots can be verified.

If desired the above described system can be modified to include the symbols used on the electronic gaming device in the central computer. These symbols are then downloaded to each electronic gaming machine and a random number generator in each gaming machine then determines the result that is displayed to the player. When the remote gaming machines are turned off or become disabled, all computer memory in the remote gaming machines is deleted and the remote gaming machine cannot be reactivated unless authorized by the central computer, in which case new playing hands are downloaded to the remote gaming machine.

The same principles can be applied to slot machines with a plurality of reel stop positions being downloaded from a central computer to each remote slot machine.

In summary, with the expansion of gaming in the U.S. at spectacular new heights, it is believed that the development of gaming formats which will closely fit both the desires of the public and the legal strictures imposed by various governmental and regulatory bodies is both desirable and necessary. The new pari-mutuel gaming machines described in this patent application will fit these desires and market demands.

While the invention has been illustrated with respect to several specific embodiments thereof, these embodiments should be considered as illustrative rather than limiting. The payout numbers used in the various examples are only representative and the house can varying the payout values at its discretion. Some winning combinations and coin columns can have fixed payouts, some winning combinations and coin columns can have progressive payouts and some winning combinations and coin columns can have both fixed and progressive payouts. Various modifications and additions may be made and will be apparent to those skilled in the art. Accordingly, the invention should not be limited by the foregoing description, but rather should be defined only by the following claims.

What is claimed is:

1. A method of playing a live casino table game comprising:

a) a player making a wager to participate in the live casino table game;

b) allocating a portion of the wager to the gaming establishment as its share of the wager for providing the game;

c) allocating the remainder of the wager to a common pari-mutuel pool to provide a source of funds for paying the player;

d) determining whether the player is a winner or loser for a particular play of the game;

e) paying the player a predetermined payout amount from the common pari-mutuel pool for a winning play; and f) collecting all losing wagers into the common pari-mutuel pool.

2. The method of claim 1 in which the live casino table game is twenty-one and the predetermined payout amount is based on conventional twenty-one winning combinations.

3. The method of claim 1 in which the live casino table game is craps and the predetermined payout amount is based on conventional craps winning combinations.

4. The method of claim 1 in which the live casino table game is baccarat and the predetermined payout amount is based on conventional baccarat winning combinations.

5. The method of claim 1 in which the live casino table game is selected from the group consisting of poker, twenty-one, craps, baccarat, pai-gow poker, roulette and [Caribbean Stud®] *CARIBBEAN STUD®* poker.

6. The method of claim 1 wherein the step of allocating a portion of the wager to the gaming establishment is effected by designating a percentage of the player's wager to the gaming establishment.

7. The method of claim 1 wherein the step of allocating a portion of the wager to the gaming establishment is effected by designating a preestablished amount of the player's buy in to the gaming establishment.

8. The method of claim 1 wherein the step of allocating a portion of the wager to the gaming establishment is effected by imposing a flat fee charge to the player and designating that flat fee charge to the gaming establishment.

9. The method of claim 47 wherein the flat fee charge is imposed at the beginning of play.

10. The method of claim 47 wherein the flat fee charge is imposed on a time period basis.

11. The method of claim 1 further including allocating a portion of the predetermined payout amount to the gaming establishment.

12. A method of playing a plurality of live casino table games linked together and sharing a common pari-mutuel pool comprising:

a) a player making a wager to participate in one of the live casino table games;

b) allocating a portion of the wager to the gaming establishment as its share of the wager for providing the game;

c) allocating the remainder of the wager to a common pari-mutuel pool to provide a source of funds for paying the player;

d) determining whether the player is a winner or loser for a particular play of the game;

e) paying the player a predetermined payout amount from the common pari-mutuel pool for a winning play; and f) collecting all losing wagers into the common pari-mutuel pool.

13. The method of claim 12 in which all of the live casino table games are twenty-one and the predetermined payout amount is based on conventional twenty-one winning combinations.

14. The method of claim 12 in which all of the live casino table games are craps and the predetermined payout amount is based on conventional craps winning combinations.

15. The method of claim 12 in which all of the live casino table games are baccarat and the predetermined payout amount is based on conventional baccarat winning combinations.

16. The method of claim 12 in which all of the live casino table games are selected from the group consisting of poker, twenty-one, craps, baccarat, pai-gow poker, roulette and [Caribbean Stud®] *CARIBBEAN STUD®* poker.

17. The method of claim 12 in which the live casino table games are selected from the group consisting of poker, twenty-one, craps, baccarat, pai-gow poker, roulette and [Caribbean Stud®] *CARIBBEAN STUD®* poker.

18. The method of claim 12 wherein the step of allocating a portion of the wager to the gaming establishment is effected by designating a percentage of the player's wager to the gaming establishment.

19. The method of claim 12 wherein the step of allocating a portion of the wager to the gaming establishment is effected by designating a preestablished amount of the player's buy in to the gaming establishment.

20. The method of claim 12 wherein the step of allocating a portion of the wager to the gaming establishment is effected by imposing a flat fee charge to the player and designating that flat fee charge to the gaming establishment.

21. The method of claim 20 wherein the flat fee charge is imposed at the beginning of play.

22. The method of claim 20 wherein the flat fee charge is imposed on a time period basis.

23. The method of claim 12 further including allocating a portion of the predetermined payout amount to the gaming establishment.

24. A method of playing a plurality of various live casino table games, the live casino table games being linked together and each type of live casino table games sharing a common pari-mutuel pool and all of the common pari-mutuel pools sharing a master casino pari-mutuel pool comprising:

a) a player making a wager to participate in one of the variety of live casino table games;

b) allocating a portion of the wager to the gaming establishment as its share of the wager for providing the game;

c) allocating the remainder of the wager to a common pari-mutuel pool for that particular variety of live casino table game to provide a source of funds for paying the player;

d) determining whether the player is a winner or loser for a particular play of the game;

e) paying the player a predetermined payout amount from the common pari-mutuel pool for a winning play; and f) collecting all losing wagers into the common pari-mutuel pool;

g) allocating a portion of the common pari-mutuel pool to a master casino pari-mutuel pool to provide a source of funds for the common pari-mutuel pool as needed.

25. The method of claim 24 in which the live casino table games are selected from the group consisting of poker, twenty-one, craps, baccarat, pai-gow poker, roulette, *keno* and [Caribbean Stud®] *CARIBBEAN STUD®* poker.

26. The method of claim 24 wherein the step of allocating a portion of the wager to the gaming establishment is effected by designating a percentage of the player's wager to the gaming establishment.

27. The method of claim 24 wherein the step of allocating a portion of the wager to the gaming establishment is effected by designating a preestablished amount of the player's buy in to the gaming establishment.

28. The method of claim 24 wherein the step of allocating a portion of the wager to the gaming establishment is effected by imposing a flat fee charge to the player and designating that flat fee charge to the gaming establishment.

29. The method of claim 28 wherein the flat fee charge is imposed at the beginning of play.

30. The method of claim 28 wherein the flat fee charge is imposed on a time period basis.

31. The method of claim 24 further including allocating a portion of the predetermined payout amount to the gaming establishment.

32. A method of playing a plurality of various live casino table games and electronic pari-mutuel gaming devices, the live casino table games and electronic pari-mutuel gaming devices being linked together and each type of live casino table games sharing a common pari-mutuel pool and each type of electronic pari-mutuel gaming device sharing a common pari-mutuel pool and all of the common pari-mutuel pools sharing a master casino pari-mutuel pool comprising:

a) a player making a wager to participate in one of the variety of live casino table games or electronic pari-mutuel gaming devices;

b) allocating a portion of the wager to the gaming establishment as its share of the wager for providing the game;

c) allocating the remainder of the wager to a common pari-mutuel pool for that particular variety of live casino table game or electronic pari-mutuel gaming device to provide a source of funds for paying the player;

d) determining whether the player is a winner or loser for a particular play of the game;

e) paying the player a predetermined payout amount from the common pari-mutuel pool for a winning play; and f) collecting all losing wagers into the common pari-mutuel pool;

g) allocating a portion of the common pari-mutuel pool to a master casino pari-mutuel pool to provide a source of funds for the common pari-mutuel pools as needed.

33. The method of claim 32 in which the live casino table games are selected from the group consisting of poker, twenty-one, craps, baccarat, pai-gow poker, roulette, *keno* and [Caribbean Stud®] *CARIBBEAN STUD®* poker and the electronic pari-mutuel gaming devices are selected from the group consisting of slot machines, electronic video poker, electronic twenty-one, *electronic keno* and electronic craps.

34. The method of claim 32 wherein the step of allocating a portion of the wager to the gaming establishment is effected by designating a percentage of the player's wager to the gaming establishment.

35. The method of claim 32 wherein the step of allocating a portion of the wager to the gaming establishment is effected by designating a preestablished amount of the player's buy in to the gaming establishment.

36. The method of claim 32 wherein the step of allocating a portion of the wager to the gaming establishment is effected by imposing a flat fee charge to the player and designating that flat fee charge to the gaming establishment.

37. The method of claim 36 wherein the flat fee charge is imposed at the beginning of play.

38. The method of claim 36 wherein the flat fee charge is imposed on a time period basis.

39. The method of claim 32 further including allocating a portion of the predetermined payout amount to the gaming establishment.

40. A method of playing a plurality of various live casino table games, electronic pari-mutuel gaming devices and live pari-mutuel games, the live casino table games, electronic pari-mutuel gaming devices and live pari-mutuel sporting events being linked together and each type of live casino table game sharing a common pari-mutuel pool, each type of electronic pari-mutuel gaming device sharing a common pari-mutuel pool and each type of live pari-mutuel sporting event sharing a common pari-mutuel pool and all of the common pari-mutuel pools sharing a master pari-mutuel pool comprising:

a) a player making a wager to participate in one of the variety of live casino table games, electronic pari-mutuel gaming devices or live pari-mutuel sporting events;

b) allocating a portion of the wager to the gaming establishment as its share of the wager for providing the game;

c) allocating the remainder of the wager to a common pari-mutuel pool for that particular variety of live casino table game, electronic pari-mutuel gaming devices or live pari-mutuel sporting events to provide a source of funds for paying the player;

d) determining whether the player is a winner or loser for a particular play of the game;

e) paying the player a predetermined payout amount from the common pari-mutuel pool for a winning play; and f) collecting all losing wagers into the common pari-mutuel pool;

g) allocating a portion of the common pari-mutuel pool to a master pari-mutuel pool to provide a source of funds for the common pari-mutuel pools as needed.

41. The method of claim 40 in which the live casino table games are selected from the group consisting of poker, twenty-one, craps, baccarat, pai-gow poker, roulette, *keno* and [Caribbean Stud®] *CARIBBEAN STUD®* poker, the electronic pari-mutuel gaming devices are selected from the group consisting of slot machines, electronic video poker, electronic twenty-one, *electronic keno* and electronic craps and the live pari-mutuel sporting events are selected from the group consisting of horse racing and dog racing.

42. The method of claim 40 wherein the step of allocating a portion of the wager to the gaming establishment is effected by designating a percentage of the player's wager to the gaming establishment.

43. The method of claim 40 wherein the step of allocating a portion of the wager to the gaming establishment is effected by designating a preestablished amount of the player's buy in to the gaming establishment.

44. The method of claim 40 wherein the step of allocating a portion of the wager to the gaming establishment is effected by imposing a flat fee charge to the player and designating that flat fee charge to the gaming establishment.

45. The method of claim 44 wherein the flat fee charge is imposed at the beginning of play.

46. The method of claim 44 wherein the flat fee charge is imposed on a time period basis.

47. The method of claim 40 further including allocating a portion of the predetermined payout amount to the gaming establishment.

48. A method of playing a casino game which includes a pari-mutuel pool that is closed comprising:

a) a player making a wager to participate in the casino game;

b) allocating a portion of the wager to the gaming establishment as its share of the wager for providing the game;

c) allocating the remainder of the wager to a common pari-mutuel pool to provide a source of funds for paying the player;

d) determining whether the player is a winner or loser for a particular play of the game;

e) paying the player a predetermined payout amount from the common pari-mutuel pool for a winning play;

f) collecting all losing wagers into the common pari-mutuel pool;

g) declaring after a length of time that the common pari-mutuel pool is closed;

h) paying the next winning player all of the amount collected in the common pari-mutuel pool.

49. The method of claim 48 in which the casino game is twenty-one and the predetermined payout amount is based on conventional twenty-one winning combinations.

50. The method of claim 48 in which the casino game is craps and the predetermined payout amount is based on conventional craps winning combinations.

51. The method of claim 48 in which the casino game is baccarat and the predetermined payout amount is based on conventional baccarat winning combinations.

52. The method of claim 48 in which the casino game is selected from the group consisting of poker, twenty-one, craps, baccarat, pai-gow poker, roulette, *keno* and [Caribbean Stud®] *CARIBBEAN STUD®* poker.

53. The method of claim 48 in which the casino game is an electronic device and is selected from the group consisting of slot machines, electronic video poker, *electronic keno, electronic craps* and electronic twenty-one.

54. The method of claim 48 wherein the step of allocating a portion of the wager to the gaming establishment is effected by designating a percentage of the player's wager to the gaming establishment.

55. The method of claim 48 wherein the step of allocating a portion of the wager to the gaming establishment is effected by designating a preestablished amount of the player's buy in to the gaming establishment.

56. The method of claim 48 wherein the step of allocating a portion of the wager to the gaming establishment is effected by imposing a flat fee charge to the player and designating that flat fee charge to the gaming establishment.

57. The method of claim 56 wherein the flat fee charge is imposed at the beginning of play.

58. The method of claim 56 wherein the flat fee charge is imposed on a time period basis.

59. The method of claim 48 further including allocating a portion of the predetermined payout amount to the gaming establishment.

*60. The method of claim 1 in which the live casino table game is keno and the predetermined payout amount is based on conventional keno winning combinations.*

*61. The method of claim 12 in which the live casino table games are keno and the predetermined payout amount is based on conventional keno winning combinations.*

*62. The method of claim 48 in which the casino game is keno and the predetermined payout amount is based on conventional keno winning combinations.*

*63. The method of claim 1 in which the live casino table game is a card came and the predetermined payout amount is based on conventional winning combinations for the card game.*

*64. The method of claim 1 in which the live casino table game is a dice game and the predetermined payout amount is based on conventional winning combinations for the dice game.*

*65. The method of claim 12 in which all of the live casino table games are a card game and the predetermined payout amount is based on conventional winning combinations for the card game.*

*66. The method of claim 12 in which all of the live casino table games are a dice game and the predetermined payout amount is based on conventional winning combinations for the dice game.*

*67. The method of claim 24 in which the live casino table games are a card game and the predetermined payout amount is based on conventional winning combinations for the card game.*

*68. The method of claim 24 in which the live casino table games are a dice game and the predetermined payout amount is based on conventional winning combinations for the dice game.*

*69. The method of claim 32 in which the live casino table games are a card game and the predetermined payout amount is based on conventional winning combinations for the card game.*

*70. The method of claim 32 in which the live casino table games are a dice game and the predetermined payout amount is based on conventional winning combinations for the dice game.*

*71. The method of claim 40 in which the live casino table games are a card game and the predetermined payout amount is based on conventional winning combinations for the card game.*

*72. The method of claim 40 in which the live casino table games are a dice came and the predetermined payout amount is based on conventional winning combinations for the dice game.*

*73. The method of claim 48 in which the casino game is a card game and the predetermined payout amount is based on conventional winning combinations for the card game.*

*74. The method of claim 48 in which the casino game is a dice game and the predetermined payout amount is based on conventional winning combinations for the dice game.*

* * * * *